(12) United States Patent
Apfelthaler

(10) Patent No.: US 7,104,021 B2
(45) Date of Patent: Sep. 12, 2006

(54) TERMINAL PLUG FOR SCREWING A MUNTIN BAR TO A SPACER FRAME OF IN PARTICULAR AN INSULATED GLASS WINDOW

(76) Inventor: Harald Apfelthaler, Berliner Strasse 29, D-90579 Langenzenn (DE)

( * ) Notice: Subject to any disclaimer, the term of this patent is extended or adjusted under 35 U.S.C. 154(b) by 0 days.

(21) Appl. No.: 09/839,001

(22) Filed: Apr. 20, 2001

(65) Prior Publication Data

US 2002/0048486 A1   Apr. 25, 2002

(30) Foreign Application Priority Data

Oct. 20, 2000 (DE) .......................... 200 18 012 U

(51) Int. Cl.
*E04C 2/38* (2006.01)
(52) U.S. Cl. ................ 52/656.9; 52/204.61; 52/656.4; 52/656.5; 52/786.13; 403/231; 403/255; 403/298; 403/401
(58) Field of Classification Search ................ 52/741, 52/656.9, 656, 398, 399, 400, 171, 172, 455, 52/314, 656.4, 204.61, 786.1, 786.13; 249/451, 249/453, 458; 403/254, 255, 231, 295, 298, 403/187, 401
See application file for complete search history.

(56) References Cited

U.S. PATENT DOCUMENTS

| | | | | |
|---|---|---|---|---|
| 1,052,670 A * | 2/1913 | La Francis | .................... | 52/509 |
| 1,768,157 A * | 6/1930 | Shelden | ........................ | 52/667 |
| 2,181,698 A * | 11/1939 | Langenberg | ................. | 52/258 |
| 2,261,510 A * | 11/1941 | Atcheson | ........................ | 52/97 |
| 3,293,817 A * | 12/1966 | MacGregor | ................... | 52/456 |
| 3,766,698 A * | 10/1973 | Dallen | .......................... | 52/400 |
| 3,785,104 A * | 1/1974 | Dailen | .......................... | 52/400 |
| 3,866,380 A * | 2/1975 | Benson | ....................... | 52/656.6 |
| 3,932,971 A * | 1/1976 | Day | ............................. | 52/171 |
| 4,120,122 A * | 10/1978 | Bahr | .............................. | 52/58 |
| 4,222,209 A * | 9/1980 | Peterson | ....................... | 52/172 |
| 4,357,744 A * | 11/1982 | McKenzie et al. | ............ | 29/451 |
| 4,418,506 A * | 12/1983 | Weber et al. | ................. | 52/209 |
| 4,530,195 A * | 7/1985 | Leopold | .................. | 52/717.02 |
| 4,628,582 A * | 12/1986 | Leopold | ....................... | 29/451 |
| 4,683,634 A * | 8/1987 | Cole | ........................... | 29/412 |
| 4,707,963 A * | 11/1987 | Governale | .................... | 52/741 |
| 5,048,997 A * | 9/1991 | Peterson | ..................... | 403/295 |
| 5,099,626 A * | 3/1992 | Seeger | ......................... | 52/314 |
| 5,177,920 A * | 1/1993 | Rafeld | .......................... | 52/278 |
| 5,261,203 A * | 11/1993 | Yoon | ........................... | 52/455 |

(Continued)

FOREIGN PATENT DOCUMENTS

DE     9204763     8/1993

(Continued)

*Primary Examiner*—Jeanette Chapman
*Assistant Examiner*—Yvonne M. Horton
(74) *Attorney, Agent, or Firm*—Gifford, Krass, Groh, Sprinkle, Anderson & Citkowski, P.C.

(57) ABSTRACT

A terminal for use with a muntin bar or cross includes a muntin bar and a terminal plug. The muntin bar has an end and an outer surface. The end of the muntin bar includes a hollow space and an inner wall. The terminal plug is adapted to be inserted into the end of the muntin and includes a flange, a plug body and a longitudinal slot. When installed in the muntin, the flange engages the outer surface of the muntin. The plug body is designed to provide a press fit with the inner wall of the muntin by having at least part of the plug body being pressed against the inner wall of the muntin.

7 Claims, 2 Drawing Sheets

U.S. PATENT DOCUMENTS

| | | | |
|---|---|---|---|
| 5,312,215 A * | 5/1994 | Anquetin | 411/38 |
| 5,428,924 A * | 7/1995 | Pifer | 49/50 |
| 5,653,074 A * | 8/1997 | Yoon | 52/210 |
| 5,657,590 A * | 8/1997 | Digman et al. | 52/204.61 |
| 5,678,376 A * | 10/1997 | Poma | 52/656.8 |
| 5,678,377 A * | 10/1997 | Leopold | 52/656.9 |
| 6,164,884 A * | 12/2000 | Mayr | 411/36 |
| 6,244,012 B1 * | 6/2001 | McGlinchy et al. | 52/665 |
| 6,301,843 B1 * | 10/2001 | Silverman | 52/204.5 |
| 6,425,221 B1 * | 7/2002 | Reichert | 52/456 |

FOREIGN PATENT DOCUMENTS

| | | |
|---|---|---|
| DE | 9402404 | 4/1994 |
| DE | 9418426 | 1/1995 |
| DE | 94 18 426.7 | 3/1995 |
| DE | 4404630 | 8/1995 |
| EP | 0763645 | 3/1997 |
| EP | 1199435 B1 | 4/2002 |

* cited by examiner

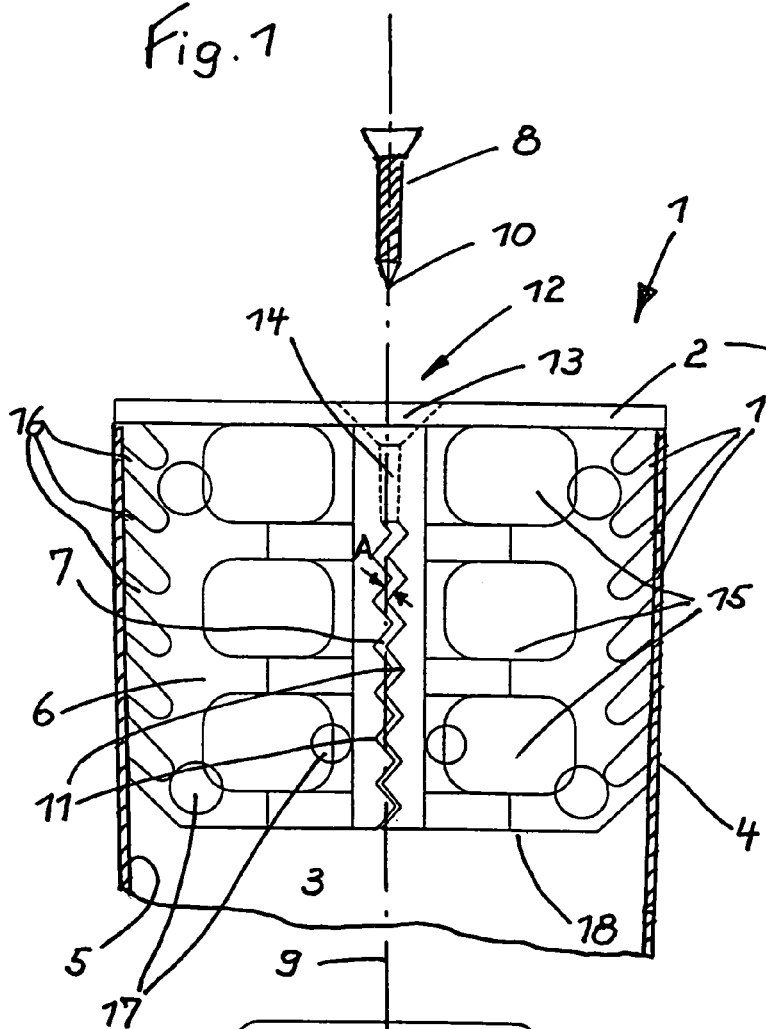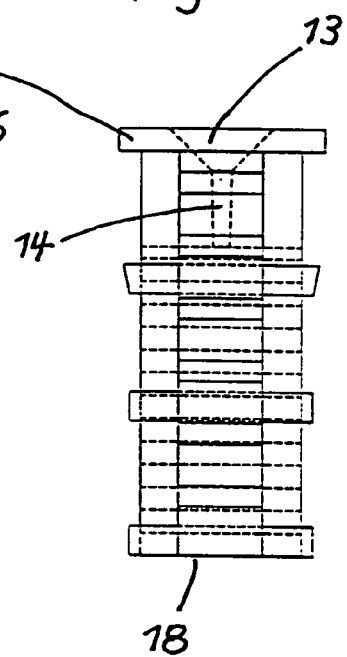

ated slot is provided on said plug body, wherein the plug body is provided with a slot extending entirely through it and penetrating also flange 2. By inserting a screw into this slot, the plug body 6 is widened along the slot.

TERMINAL PLUG FOR SCREWING A MUNTIN BAR TO A SPACER FRAME OF IN PARTICULAR AN INSULATED GLASS WINDOW

This invention relates to a terminal plug made out of plastic material for screwing a muntin bar or a muntin cross to a spacer frame of in particular an insulated glass window, comprising a flange which is to be positioned onto an outer surface of the muntin bar, and a plug body to be fitted into a hollow space of the muntin profile, wherein, when installed into the muntin bar, the plug body provides a press fit by at least a part of its surface pressed against a surface of an inner wall of the muntin bar.

BACKGROUND OF THE INVENTION

Such a kind of terminal plug is known already in the art.

Moreover, no plastic connecting elements for connecting muntin bars to one another at their crossing point are known, i.e. connecting a stay bar and a transom both being part of an insulated glass window, wherein one of said muntin bars is a one-piece muntin and the other one is a two-part muntin, both being made of a hollow profile body and being arranged between the two panes of a glass window. Thereby, the connecting element consists of a two-part junction piece that is to be arranged within the hollow space of the two-part muntin or transom, thus fixing the transom to the stay bar, wherein both the two pieces of the two-part junction piece include longitudinal slots, into which a taper key is to be inserted, so that the two pieces of the junction piece are spread apart and thus are wedged within the hollow space. Further, both the two pieces are provided with a bore hole, respectively, which is axially aligned and through which a screw is to be inserted traversing the one-piece muntin or stay bar and connecting the two pieces of the two-part junction piece together by screwing and thus fixing the latter to the stay bar.

SUMMARY OF THE INVENTION

It is an object of the present invention to provide a terminal plug of the prescribed art, which in particular can be conveniently used for fixing muntin bars, muntin crosses or gratings thereof in a spacer frame of an insulated glass window, if the connection of said muntin bars is to be realized by means of screwing.

It is another object of the invention to provide a terminal plug which can be manufactured by means of an automatic assembly line or on a special mounting device.

It is yet another object of the invention to provide a terminal plug according to which a distortion of a muntin bar can be efficiently prevented.

Finally, it is an object of the invention to provide a terminal plug which offers an improved handling and reveals an improved imperviousness of the frame.

According to a main concept of the invention, there is provided a terminal plug which is formed such that it can be widened or spread apart.

According to preferred embodiments of the invention, the terminal plug body comprises a slot positioned in the longitudinal direction thereof, which slot is conveniently aligned coaxial to the middle axis of the plug and passes entirely through it, wherein it penetrates a flange of the plug, so that by inserting a screw into the slot said plug body is widened along the slot.

The longitudinal slot may be formed in different widths, that is that the slot may be wider in the upper part facing the flange of the terminal plug than in the lower part facing the bottom of the terminal plug. By using a relieved surface or slotted walls, as for example a relieved wall being provided with notches, an improved spreading function is gained as also an improved anchorage of the fastening screw, which screw is, by passing through the flange, axially screwed into said slot, so that the terminal plug is widened and thus pressed towards the inner wall of the profile of the muntin or muntin cross.

Since there is some refuse by screwing the screw into the spacer frame being made out of a hollow profile, it turned out to be of good use to provide a recess at the upper end of the slot within said flange of the terminal plug, so that the refuse can be received in the recess which is composed of two parts, the one of which forms a receiving cone leading up to a cylindrical cavity. Thereby, both the two parts are adequately adapted in size to enable a complete receipt of such refuse.

BRIEF DESCRIPTION OF THE DRAWINGS

Other objects and a better understanding of the invention will be had by referring to the following description and claims of a preferred embodiment thereof taken in conjunction with the accompanying drawings in which FIG. 1 is a front view of the terminal plug being installed in an axially cut-away muntin bar profile;

FIG. 2 is a side view of the terminal plug seen in FIG. 1; and

FIG. 3 is a plan view of the terminal plug seen in FIG. 1.

DESCRIPTION OF THE PREFERRED EMBODIMENT OF THE INVENTION

Figure 4:
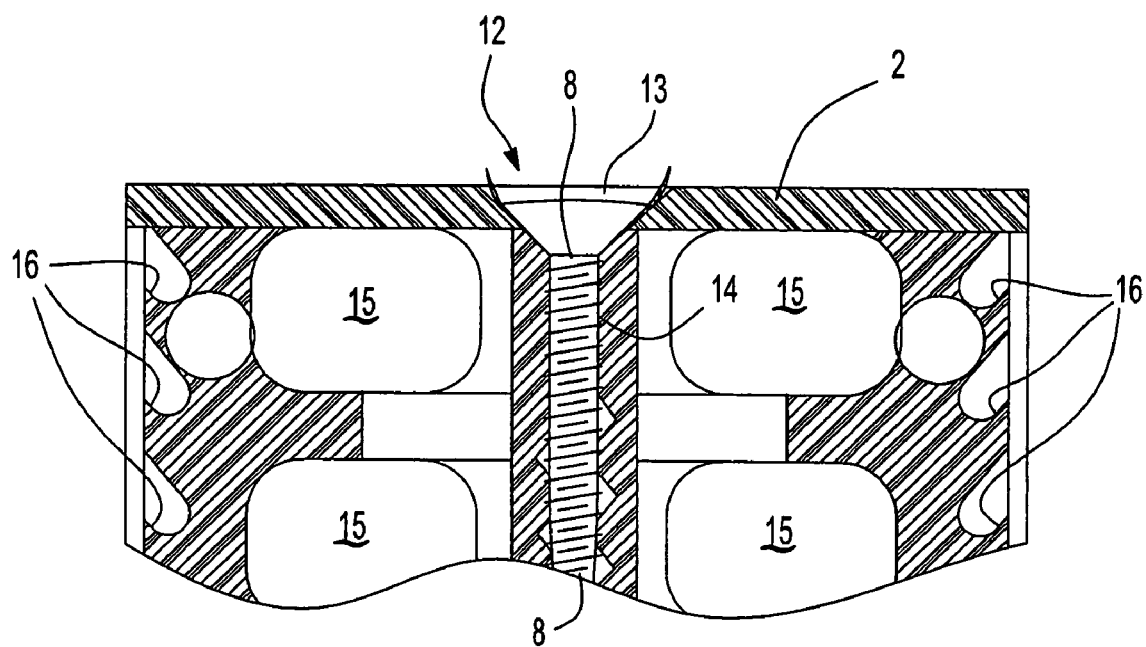
FIG. 4 is a partial front cut away view of the terminal plug installed in a muntin bar profile.

The terminal plug 1 shown in FIGS. 1 to 3 is made out of a plastic material, wherein, by means of screwing, the plug serves to fix muntin bars or muntin crosses to a spacer frame (not shown in the drawings) of in particular an insulated glass window. FIG. 1 shows one end of a hollow profiled muntin bar 4 in a longitudinal section thereof, wherein a plug body 6 of the terminal plug is inserted into a hollow space 3 of the muntin bar. At one end of the plug body there is provided a flange 2 which is positioned onto the outer surface at the end of the muntin bar, thus preventing the terminal plug from being inserted to far into the hollow space 3 of the muntin bar.

The plug body 6 is adapted in its size in known manner, so that its profile section fits to the profile section of the hollow space of the muntin bar 4, wherein the plug body 6 comprises laminally formed spring elements 16 at its outer periphery for compensating gap tolerances. Thus, said spring elements 16 fit close to an inner wall 5 of the muntin bar 4 leading to a nearly friction-tight engagement connection. In addition, for the purpose of saving material, the terminal plug is provided with openings 15 and 17.

After having inserted the terminal plug 1, i.e. the plug body 6 into the muntin bar, a tight anchorage between these parts is effected by forming the terminal plug 1 such that it can be widened or spread apart, as this can be seen in FIG. 1. For spreading the plug body apart a longitudinally formed slot 7 is provided, which is coaxially aligned along with the longitudinal axis 9 of the plug body 6. Into said slot 7 a screw 8 is to be screwed in, passing through the flange 2 which in turn is arranged at the upper end of the plug body. By screwing the screw into the slot 7, the slot is widened, so that the laminally formed spring elements 16 are pressed against the inner wall 5 of the muntin bar, leading to the fact that the plug is prevented from slipping out of the muntin bar.

The longitudinal slot 7 has an uneven surface, respectively, i.e. a slotted wall, the relief of which is formed like having teeth 11 which are arranged successively along the direction of the slot. The teeth thereby are formed such that the distance A of the opposing walls provided with said teeth becomes smaller beginning from the upper end having the flange 2 down to the bottom end 18 of the plug. By screwing the screw into the slot, the tip 10 of the screw 8 abuts against the successively arranged teeth 11, wherein said longitudinal slot 7 is widened, that is, with respect to this embodiment, there is no visual contact between the two ends of the slot since the tips of said teeth 11 obstruct the view as long as the screw 8 is not screwed into the slot.

For the purpose of receiving a removal of shavings there is provided a recess 12 at the upper end of the longitudinal slot 7 and passing through the flange 2, wherein said removal derives from screwing the screw 8 through the spacer frame from the outside thereof before the screw 8 passes through the flange 2. Since said frame is generally made out of metal, metallic shavings and slivers are produced which are transported from the bore hole of the spacer frame to the terminal plug. The recess 12 is formed by a cone 13 followed by a cylindrical hollow space 14, the cubature of each of them is adapted in accordance to the expected content of refusal, thus preventing the shavings and slivers from being deposited between the surface of the flange 2 and the inner surface of the spacer frame that otherwise would lead to prevent a fitted junction between the flange surface and the frame surface.

According to a further embodiment, the above mentioned distance A of the opposing walls of the longitudinal slot 7 provided with said teeth is chosen such that it is in the range of 2 mm near the upper end of the slot, whereas it is in the range of 0.5 mm at its bottom end, noting that these values are to be referred to a terminal plug which is not yet installed, i.e. that a screw 8 has not yet been inserted into the terminal plug for spreading it apart.

What is claimed is:

1. A terminal plug for screwing a muntin bar or a muntin cross to a spacer frame of in particular an insulated glass window, comprising in combination:
    a muntin having an end and an outer surface, the end of said muntin including an inner wall defining a hollow space;
    a terminal plug including a plug body that is insertable into the hollow space of the muntin, a flange positioned on the plug body and a plurality of spring elements extending from the plug body, the flange being operable to engage the outer surface of the muntin when the plug body is inserted into the hollow space of the muntin, the plug body defining a longitudinal slot and being operable to be spread apart when inserted into the muntin such that the terminal plug is anchored against the inner wall of the muntin, the plurality of spring elements being operable to engage inner wall of the muntin, the width of the plug body and plurality of spring elements being greater than the width of the hollow space of the muntin such that the spring elements create a nearly friction-tight engagement connection with the inner wall of the end of the muntin upon insertion of the plug body into the hollow space; and
    wherein said flange further comprises a recess, said recess communicating with said longitudinal slot.

2. The terminal plug of claim 1, wherein the plug body comprises opposing walls that define the longitudinal slot.

3. The terminal plug of claim 2, wherein each wall of the opposing walls of the longitudinal slot comprises a slotted wall.

4. The terminal plug of claim 3, wherein each slotted wall comprises a plurality of teeth.

5. The terminal plug of claim 4, wherein the plug body has an upper end and a bottom end and a distance between the plurality of teeth on each of the slotted walls becomes smaller from the upper end to the bottom end of the plug body.

6. A terminal plug made out of plastic for screwing a muntin bar or a muntin cross to a spacer frame of in particular an insulated glass window, comprising in combination:
    a muntin having an end and an outer surface, the end of the muntin including a hollow space and an inner wall; and
    a terminal plug operable to be inserted into the hollow space of the muntin, the terminal plug having a body including an outer surface, a flange and defining a longitudinal slot, the longitudinal slot having an upper end and a bottom end, the upper end defining a recess that extends through the flange, the longitudinal slot further being adapted to receive a screw passing through the recess in the flange such that the body is operable to be spread apart and provide a press fit by at least a part of its outer surface against the inner wall of the muntin when the body its positioned in the hollow space of the muntin and a screw is received in the longitudinal slot with the recess of the flange being operable to receive refuse material resulting from the screw being received within the longitudinal slot.

7. The terminal plug and muntin combination according to claim 6, wherein the recess is formed by a cone followed by a cylindrical hollow space, the volume of the cone and cylindrical hollow space.

* * * * *